(12) United States Patent
Lee et al.

(10) Patent No.: US 9,519,161 B2
(45) Date of Patent: Dec. 13, 2016

(54) WAVELENGTH CONVERSION MEMBER, BACKLIGHT ASSEMBLY, AND DISPLAY DEVICE INCLUDING THE SAME

(71) Applicant: Samsung Display Co., Ltd., Yongin, Gyeonggi-Do (KR)

(72) Inventors: Yeong Bae Lee, Suwon-si (KR); Seok Hyun Nam, Seoul (KR); Seung Hwan Baek, Seoul (KR); Sang Won Lee, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/295,683

(22) Filed: Jun. 4, 2014

(65) Prior Publication Data

US 2015/0219310 A1   Aug. 6, 2015

(30) Foreign Application Priority Data

Feb. 5, 2014 (KR) .................. 10-2014-0013125

(51) Int. Cl.
| | |
|---|---|
| *F21V 9/16* | (2006.01) |
| *G02F 1/01* | (2006.01) |
| *F21V 9/10* | (2006.01) |
| *F21V 9/08* | (2006.01) |
| *G02F 1/35* | (2006.01) |
| *G02F 1/355* | (2006.01) |
| *B82Y 20/00* | (2011.01) |
| *G02F 1/017* | (2006.01) |
| *G02F 1/1335* | (2006.01) |

(52) U.S. Cl.
CPC ............... *G02F 1/0105* (2013.01); *F21V 9/08* (2013.01); *F21V 9/10* (2013.01); *F21V 9/16* (2013.01); *G02F 1/353* (2013.01); *G02F 1/3556* (2013.01); *B82Y 20/00* (2013.01); *G02F 2001/01791* (2013.01); *G02F 2001/133614* (2013.01); *Y10S 977/834* (2013.01)

(58) Field of Classification Search
CPC ................ F21V 9/16; F21V 9/10; F21V 9/08; F21S 10/02
USPC ............................. 362/84, 293; 313/483, 495
See application file for complete search history.

(56) References Cited

U.S. PATENT DOCUMENTS

| | | |
|---|---|---|
| 6,611,092 B2 | 8/2003 | Fujishiro |
| 6,992,440 B2 | 1/2006 | Ishida |
| 7,819,539 B2 | 10/2010 | Kim et al. |

(Continued)

FOREIGN PATENT DOCUMENTS

| | | |
|---|---|---|
| JP | 2009-071005 | 4/2009 |
| JP | 2010-087324 | 4/2010 |

(Continued)

*Primary Examiner* — Y M Lee
(74) *Attorney, Agent, or Firm* — Innovation Counsel LLP

(57) ABSTRACT

A wavelength conversion member, a backlight assembly, and a display device including the same are provided. In one aspect, there is provided a wavelength conversion member comprising a first substrate, a second substrate, a wavelength conversion layer, and a spacer. The second substrate is positioned on the first substrate. The wavelength conversion layer is interposed between the first substrate and the second substrate. The spacer is interposed between the first substrate and the second substrate to constantly keep a distance between the first substrate and the second substrate.

22 Claims, 15 Drawing Sheets

(56) References Cited

U.S. PATENT DOCUMENTS

| | | | |
|---|---|---|---|
| 9,122,093 B2* | 9/2015 | Tsukahara | G02B 6/0038 |
| 2005/0206299 A1* | 9/2005 | Nakamura et al. | 313/495 |
| 2007/0086211 A1* | 4/2007 | Beeson et al. | 362/628 |
| 2008/0211384 A1* | 9/2008 | Sawai et al. | 313/495 |
| 2010/0176711 A1* | 7/2010 | Chang et al. | 313/495 |
| 2012/0025218 A1* | 2/2012 | Ito et al. | 257/88 |
| 2013/0148376 A1 | 6/2013 | Nick et al. | |
| 2013/0242611 A1* | 9/2013 | Wang | G02B 6/0023 362/612 |
| 2014/0361180 A1* | 12/2014 | Fujimura | H01L 27/14612 250/366 |

FOREIGN PATENT DOCUMENTS

| | | |
|---|---|---|
| JP | 2013-115351 | 6/2013 |
| KR | 1020120009686 A | 2/2012 |
| KR | 1020120116817 A | 10/2012 |

* cited by examiner

141

142

143

WAVELENGTH CONVERSION MEMBER, BACKLIGHT ASSEMBLY, AND DISPLAY DEVICE INCLUDING THE SAME

CROSS-REFERENCE TO RELATED APPLICATIONS

This application is based on and claims priority from Korean Patent Application No. 10-2014-0013125, filed on Feb. 5, 2014 in the Korean Intellectual Property Office, the disclosure of which is incorporated herein in its entirety by reference.

BACKGROUND

1. Field

The present application relates to a wavelength conversion member, a backlight assembly, and a display device including the same.

2. Description of the Prior Art

A display device is a device that displays data. The display device may be a liquid crystal display, an electrophoretic display, an organic light emitting display, an inorganic electroluminescent (EL) display, a field emission display, a surface-conduction electron-emitter display, a plasma display, or a cathode ray display.

Among such display devices, a liquid crystal display is a display device, in which a liquid crystal layer is arranged between two transparent substrates, and light permeability for each pixel is adjusted according to driving of the liquid crystal layer to display a desired image.

Since liquid crystals themselves are unable to emit light in the liquid crystal display, a backlight assembly that provides light to the liquid crystal layer is included in the liquid crystal display. Such a backlight assembly may include a light source portion, a light guide plate, a diffusion plate, a reflective plate, and various optical sheets.

In general, the light source portion that is used in the backlight assembly includes a light source emitting blue light, and a wavelength conversion material, for example, phosphor, positioned on the light source to convert the blue light into white light. Accordingly, the light source portion provides the white light to the light guide plate or the diffusion plate.

SUMMARY

If a wavelength conversion material is positioned adjacent to a light source, the characteristics of the wavelength conversion material may be dropped due to the deterioration thereof caused by the light source. Accordingly, in order to make the wavelength conversion material and the light source spaced apart from each other over a predetermined distance, a separate wavelength conversion member that includes the wavelength conversion material may be arranged on the light guide plate or the diffusion plate.

The wavelength conversion member as described above may be formed by interposing the wavelength conversion material between two substrates. However, since a general wavelength conversion material has liquidity, any one of the two substrates may be tilted or drooped when the two substrates are attached after the wavelength conversion material is spread, and this may cause the thickness of a layer that is composed of the wavelength conversion material to differ depending on the position of the layer. If the thickness of the layer that is composed of the wavelength conversion material differs depending on the position of the layer, the wavelength conversion rate of light that passes through the layer may differ to correspond to the thickness of the layer that is composed of the wavelength conversion material. That is, the color of the light that passes through the wavelength conversion member may differ depending on the position thereof, and this may directly exert a bad influence on image sharpness of a display device including the wavelength conversion member.

Accordingly, one embodiment provides a wavelength conversion member, which includes a spacer that can constantly keep the thickness of a wavelength conversion layer.

Another embodiment provides a backlight assembly, which includes the wavelength conversion member as described above.

Still another embodiment provides a display device, which includes the backlight assembly as described above.

Additional features of the inventive concept will be set forth in part in the description which follows and in part will become apparent to those having ordinary skill in the art upon examination of the following or may be learned from practice of the inventive concept.

In one aspect, there is provided a wavelength conversion member comprising a first substrate, a second substrate positioned on the first substrate, a wavelength conversion layer interposed between the first substrate and the second substrate, and a spacer interposed between the first substrate and the second substrate to constantly keep a distance between the first substrate and the second substrate.

The wavelength conversion layer may comprise quantum dots.

The wavelength conversion layer may further comprise resin mixed with the quantum dots.

A refractive index of the spacer may be substantially equal to a refractive index of the resin.

The spacer may come in direct contact with the first substrate, the second substrate, and the wavelength conversion layer.

The spacer may be mixed with the wavelength conversion layer.

The spacer may be surrounded by the wavelength conversion layer.

A plurality of spacers may be provided, and the plurality of spacers may be positioned to be randomly dispersed in the wavelength conversion layer.

The spacer may be in a spherical shape.

A diameter of the spacer may be substantially equal to a gap distance between the first substrate and the second substrate.

The spacer may comprise a plurality of hole patterns.

Each of the plurality of hole patterns may be in a polygonal column shape.

The wavelength conversion layer may be positioned in the plurality of hole patterns.

In another aspect, there is provided a backlight assembly comprising a light source configured to emit light, and a wavelength conversion member configured to convert a wavelength of the light emitted from the light source. The wavelength conversion member includes a first substrate, a second substrate positioned on the first substrate, a wavelength conversion layer interposed between the first substrate and the second substrate, and a spacer interposed between the first substrate and the second substrate to constantly keep a distance between the first substrate and the second substrate.

The wavelength conversion layer may comprise quantum dots.

The spacer may come in direct contact with the first substrate, the second substrate, and the wavelength conversion layer.

The light source may be configured to emit blue light, and the wavelength conversion member may be configured to convert the blue light into white light.

In still another aspect, there is provided a display device comprising a display panel configured to display an image, and a backlight assembly configured to provide light to the display panel, wherein the backlight assembly includes a light source configured to emit light, and a wavelength conversion member configured to convert a wavelength of the light emitted from the light source, wherein the wavelength conversion member includes a first substrate, a second substrate positioned on the first substrate, a wavelength conversion layer interposed between the first substrate and the second substrate, and a spacer interposed between the first substrate and the second substrate to constantly keep a distance between the first substrate and the second substrate.

The wavelength conversion layer may comprise quantum dots.

The light emitted from the light source may pass through the wavelength conversion member and be transferred to the display panel.

According to the various embodiments, the color of the light that passes through the wavelength conversion member can be prevented from differing depending on the position thereof.

The embodiments are not limited to the contents as exemplified above, but further various embodiments are included in the description.

BRIEF DESCRIPTION OF THE DRAWINGS

The above and other features of the inventive concept will be more apparent from the following detailed description taken in conjunction with the accompanying drawings, in which.

DETAILED DESCRIPTION OF THE EMBODIMENTS

Figure 1:
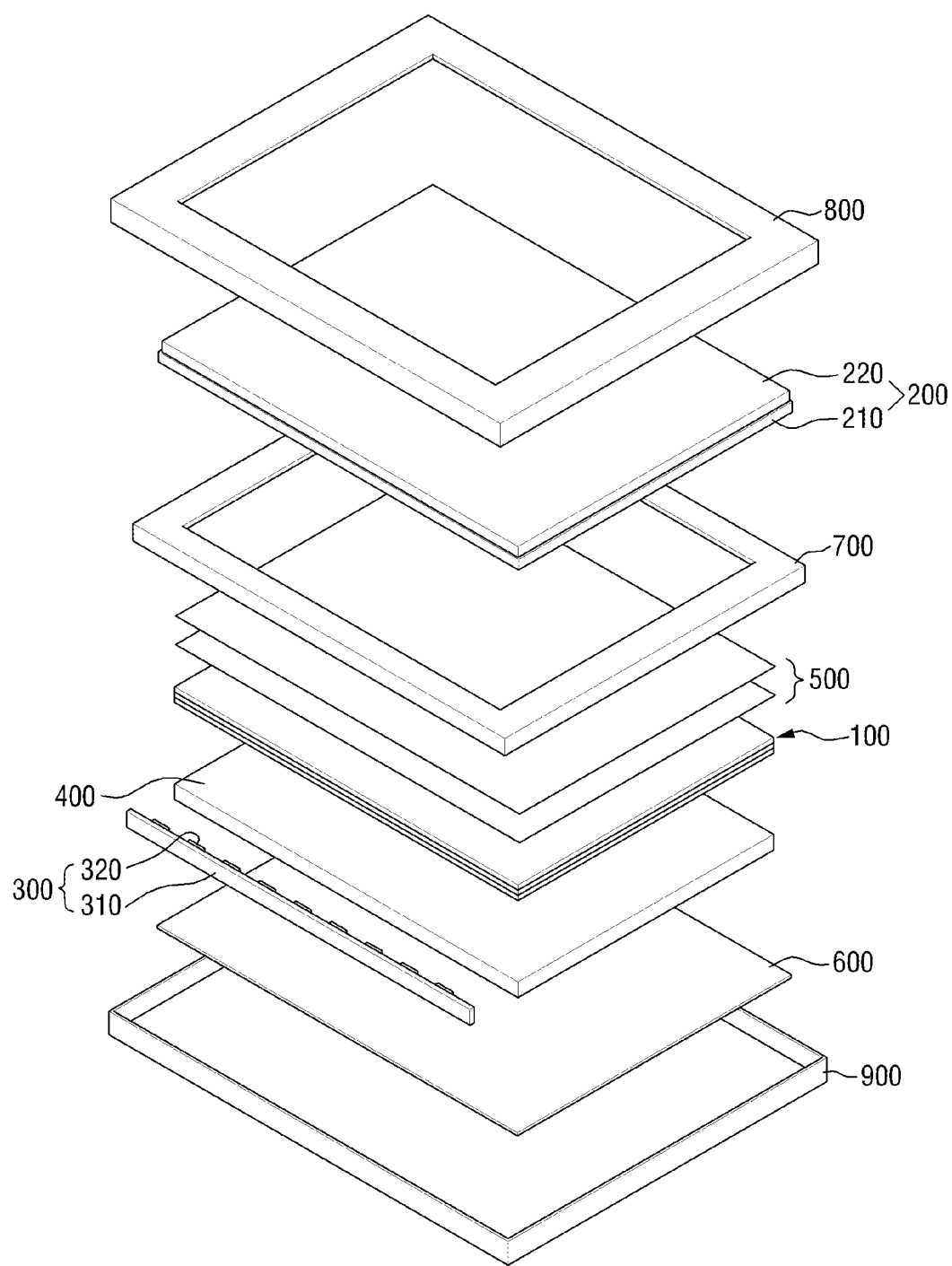
FIG. 1 is an exploded perspective view of a display device according to an embodiment.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. Thus, in some embodiments, well-known structures and devices are not shown in order not to obscure the description with unnecessary detail. Like numbers refer to like elements throughout. In the drawings, the thickness of layers and regions are exaggerated for clarity.

It will be understood that when an element or layer is referred to as being "on," or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiments described herein will be described referring to plan views and/or cross-sectional views by way of ideal schematic views. Accordingly, the exemplary views may be modified depending on manufacturing technologies and/or tolerances. Therefore, the embodiments are not limited to those shown in the views, but include modifications in configuration formed on the basis of manufacturing processes. Therefore, regions exemplified in figures have schematic properties and shapes of regions shown in figures exemplify specific shapes of regions of elements and not limit aspects of the inventive concept.

Hereinafter, embodiments will be described with reference to the accompanying drawings.

FIG. 1 is an exploded perspective view of a display device according to an embodiment. Referring to FIG. 1, a display device according to an embodiment includes a display panel 200, a backlight assembly, a top chassis 800, and a bottom chassis 900.

The display panel 200 is a panel that displays an image, and may be a liquid crystal display (LCD) panel, an electrophoretic display panel, an organic light emitting diode (OLED) panel, a light emitting diode (LED) panel, an inorganic electroluminescent (EL) display panel, a field emission display (FED) panel, a surface-conduction electron-emitter display (SED) panel, a plasma display panel (PDP), or a cathode ray tube (CRT) display panel. Hereinafter, as a display device according to an embodiment, a liquid crystal display is exemplified, and as a display panel 200, an LCD panel is exemplified. However, the display device and the display panel are not limited thereto, and various types of display devices and display panels may be used.

The display panel 200 may include a display region where an image is displayed and a non-display region where an image is not displayed. Further, the display panel 200 may include a first display substrate 210, a second display substrate 220 that faces the first display substrate 210, and a liquid crystal layer (not illustrated) interposed between the first display substrate 210 and the second display substrate 220.

The first display substrate 210 and the second display substrate 220 may be in a cuboidal shape. FIG. 1 illustrates the first display substrate 210 and the second display substrate 220 in the cuboidal shape. However, the shape of the first display substrate 210 and the second display substrate 220 is not limited thereto, but the first display substrate 210 and the second display substrate 220 may be manufactured in various shapes according to the shape of the display panel 200.

The liquid crystal layer may be interposed between the first display substrate 210 and the second display substrate 220. Further, between the first display substrate 210 and the second display substrate 220, a sealing member may be arranged along edge portions of the first display substrate 210 and the second display substrate 220 to attach and seal the first display substrate 210 and the second display substrate 220.

Although not illustrated in FIG. 1, the display panel 200 may include a driving portion and a flexible circuit board, which are attached to the first display substrate 210 or the second display substrate 220. The driving portion may apply various signals, such as driving signals, which are required to display an image on the display region. The flexible circuit board may output various kinds of signals to the driving portion.

The backlight assembly may be arranged on a lower part of the display panel 200. The backlight assembly may provide light to the display panel 200. In the description, explanation is made around an edge type backlight assembly in which a light source portion 300 is positioned on a side surface of a light guide plate 400, but is not limited thereto. Embodiments can be applied to a direct type backlight assembly in which a light source portion is positioned on a lower surface of a diffusion plate.

The backlight assembly may include the light source portion 300, the light guide plate 400, a wavelength conversion member 100, an optical sheet 500, a reflective plate 600, and a mold frame 700.

The light source portion 300 may generate light and irradiate the generated light onto the light guide plate 400. The light source portion 300 may be arranged on one side surface, that is, a light incident surface, of the light guide plate 400. In an exemplary embodiment, the light source portion 300 may be arranged to correspond to one long side of the light guide plate 400, but is not limited thereto. The light source portion 300 may be arranged to correspond to one short side of the light guide plate 400.

The light source portion 300 may include a circuit board 310 and a plurality of light sources 320 arranged on the circuit board 310.

The circuit board 310 may be arranged on the light incident surface of the light guide plate 400. The circuit board 310 may be connected to a power supply (not illustrated) to transfer electric energy to the light sources 320. The shape of one surface of the circuit board 310 that faces the light incident surface of the light guide plate 400 may correspond to the shape of the light incident surface of the light guide plate 400. In an exemplary embodiment, one surface of the circuit board 310 may be in parallel to the light incident surface of the light guide plate 400. Further, the area of one surface of the circuit board 310 may be substantially equal to the area of the light incident surface of the light guide plate 400.

The plurality of light sources 320 may be arranged on one surface of the circuit board 310. The plurality of light sources 320 may convert the electric energy that is transferred through the circuit board 310 into optical energy. The plurality of light sources 320 may be arranged to be spaced apart from each other by a predetermined distance. Further, the plurality of light sources 320 may be arranged in a line. Further, the plurality of light sources 320 may be arranged to correspond to the shape of the light incident surface of the light guide plate 400 that faces the plurality of light sources 320. Further, the plurality of light sources 320 may be light emitting diodes (LEDs). Further, the plurality of light sources 320 may emit blue light. In an exemplary embodiment, the light sources 320 may be blue light emitting diodes that emit blue light, but are not limited thereto.

In an exemplary embodiment illustrated in FIG. 1, one surface of the circuit board 310 that comes in contact with the light sources 320 is in parallel to the light incident surface, but is not limited thereto. One surface of the circuit board 310 that comes in contact with the light source 320 may be perpendicular to the light incident surface. That is, the light source portion 300 may have a side emitting structure. In this case, a separate reflective layer for guiding the light emitted from the light sources 320 in the direction of the light incident surface may be formed on the light sources 320.

The light guide plate 400 may be positioned on a side part of the light source portion 300. That is, the light guide plate 400 may be positioned on substantially the same plane as the light source portion 300. The light guide plate 400 may guide the light irradiated from the light source portion 300 to transfer the light to the wavelength conversion member 100.

The light guide plate 400 may be made of a transparent material. In an exemplary embodiment, the light guide plate 400 may be made of polymethyl-methacrylate (PMMA), but is not limited thereto. The light guide plate 400 may be made of various transparent materials capable of guiding the light. Further, the light guide plate 400 may be made of a rigid material, but is not limited thereto. The light guide plate 400 may be made of a flexible material.

The light guide plate 400 may be in a cuboidal plate shape. In the description, explanation is made around the light guide plate 400 having the cuboidal plate shape, but is not limited thereto. The light guide plate 400 may have various shapes.

The wavelength conversion member 100 may be positioned on the light guide plate 400. Specifically, the wavelength conversion member 100 may be interposed between the light guide plate 400 and the optical sheet 500, but is not limited thereto. The wavelength conversion member 100 may be interposed between the light source portion 300 and the light guide plate 400.

The wavelength conversion member 100 may convert the wavelength of the light, which is emitted from the light guide plate 400 and is incident to the wavelength conversion member 100 into a longer wavelength of the light. In an exemplary embodiment, the wavelength conversion member 100 may convert blue light, which is emitted from the light guide plate 400 and is incident to the wavelength conversion member 100, into white light, but is not limited thereto.

The area of the wavelength conversion member 100 may be substantially equal to the area of an upper surface of the light guide plate 400. Further, the area of the wavelength conversion member 100 may be substantially equal to the area of the optical sheet 500. The details of the wavelength conversion member 100 will be described in more detail later.

The optical sheet 500 may be arranged on an upper part of the wavelength conversion member 100. The optical sheet 500 may modulate the optical characteristics of the light which is emitted from a light emission surface of the light guide plate 400 and then is wavelength-converted by the wavelength conversion member 100. A plurality of optical sheets 500 may be provided. The plurality of optical sheets 500 may be stacked to overlap each other and to supplement each other. In an exemplary embodiment, the plurality of optical sheets 500 may include at least one prism sheet or a diffusion sheet.

The reflective plate 600 may be arranged on a lower side of the light guide plate 400. The reflective plate 600 may change a path of light, which is emitted from the light source portion 300 and travels to the lower side of the light guide plate 400. The reflective plate 600 may be made of a reflective material, for example, metal.

The mold frame 700 may be arranged between the display panel 200 and the optical sheet 500. The mold frame 700 is engaged with the bottom chassis 900 to fix the light source portion 300, the light guide plate 400, a reflective plate 600, the wavelength conversion member 100, the optical sheet 500, and the reflective plate 600. Further, the mold frame 700 may come in contact with the edge portion of the display panel 200 to support and fix the display panel 200.

The top chassis 800 may cover the display panel 200, and surround the side surfaces of the display panel 200 and the backlight assembly. The bottom chassis 900 may accommodate the backlight assembly. The top chassis 800 and the bottom chassis 900 are engaged with each other to surround the display panel 200 and the backlight assembly. The top chassis 800 and the bottom chassis 900 may be made of a conductive material, for example, metal.

Figure 2:
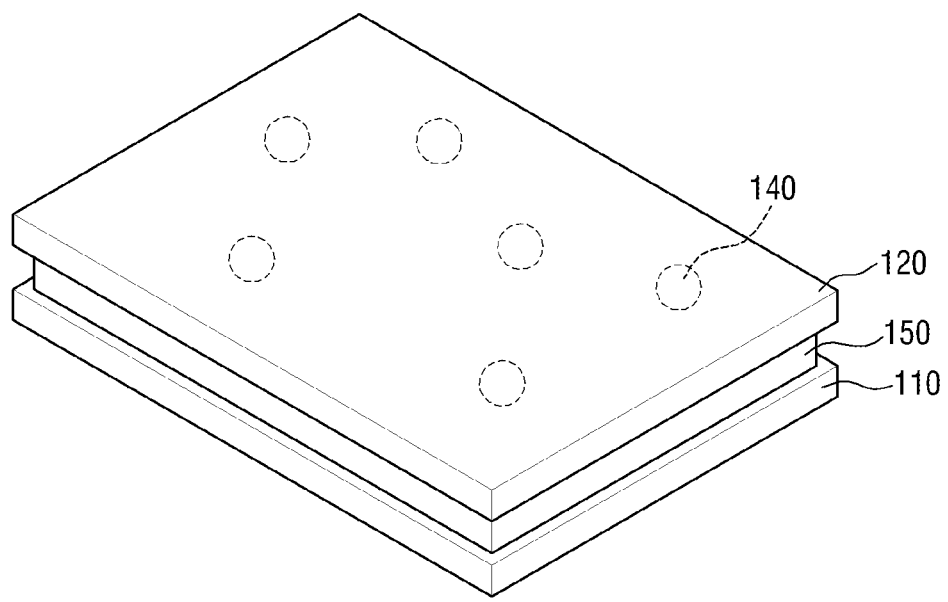
FIG. 2 is a perspective view of a wavelength conversion member of the display device of FIG. 1.
Figure 3:
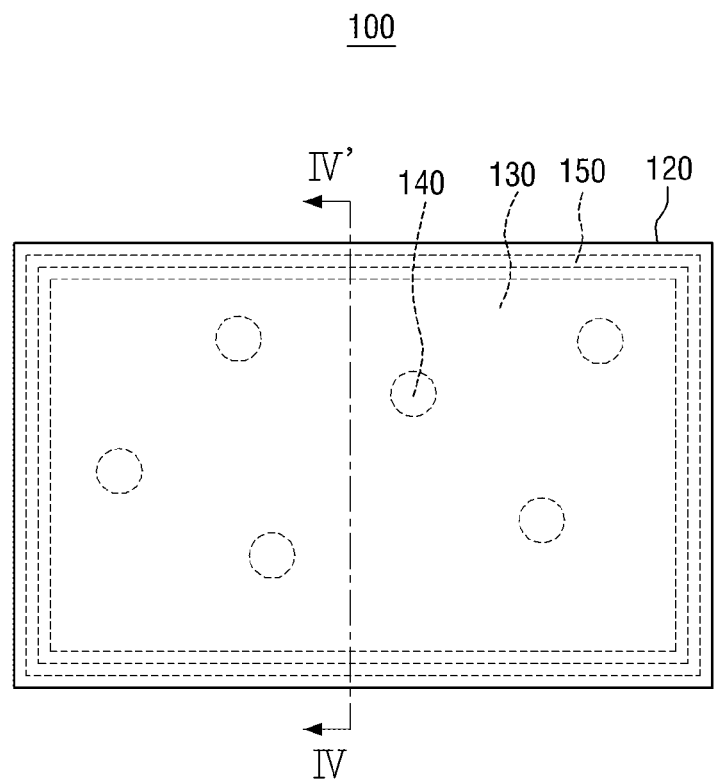
FIG. 3 is a plan view of the wavelength conversion member of FIG. 2.

Hereinafter, the wavelength conversion member 100 will be described in more detail with reference to FIGS. 2 to 4. FIG. 2 is a perspective view of the wavelength conversion member 100 of the display device of FIG. 1. FIG. 3 is a plan view of the wavelength conversion member 100 of FIG. 2, and FIG. 4 is a cross-sectional view taken along line IV-IV' of FIG. 3.

Figure 4:
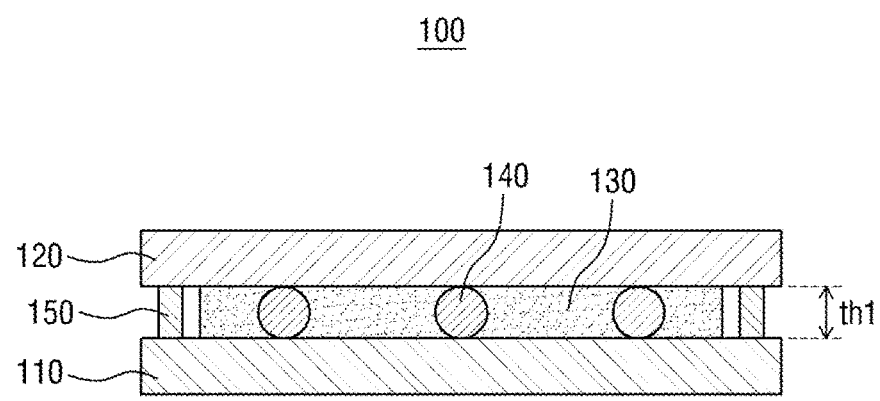
FIG. 4 is a cross-sectional view taken along line IV-IV' of FIG. 3.

Referring to FIGS. 2 to 4, the wavelength conversion member 100 may include a first substrate 110, a second substrate 120, a wavelength conversion layer 130, spacers 140, and a sealant 150.

The first substrate 110 may be arranged on a lower part of the wavelength conversion layer 130. Specifically, the first substrate 110 may be in direct contact with a lower surface of the wavelength conversion layer 130. The first substrate 110 may be transparent. Further, the first substrate 110 may have flexibility. Further, the first substrate 110 may be in a cuboidal plate shape, but is not limited thereto. The shape of the first substrate 110 may differ depending on the shape of the display panel 200 or the light guide plate 400.

The first substrate 110 may be made of a material which can protect the wavelength conversion layer 130 from not only physical impact but also external moisture and oxygen. In an exemplary embodiment, the first substrate 110 may include an insulating material, for example, silicon oxide (SiOx), silicon nitride (SiNx), or a combination thereof. In another exemplary embodiment, the first substrate 110 may be a plastic film made of polyethylene phthalate (PET) or polycarbonate (PC). In still another exemplary embodiment, the first substrate 110 may be made of a glass material.

The second substrate 120 may be arranged on the first substrate 110. Further, the second substrate 120 may be arranged on an upper part of the wavelength conversion layer 130. Specifically, the second substrate 120 may be in direct contact with an upper surface of the wavelength conversion layer 130. The second substrate 120 may be transparent. Further, the second substrate 120 may have flexibility. Further, the second substrate 120 may be in a cuboidal plate shape, but is not limited thereto. The shape of the second substrate 120 may differ depending on the shape of the display panel 200 or the light guide plate 400. Further, the shape of the second substrate 120 may be substantially the same as the shape of the first substrate 110.

The second substrate 120 may be made of a material which can protect the wavelength conversion layer 130 from not only physical impact but also external moisture and oxygen. In an exemplary embodiment, the second substrate 120 may include an insulating material, for example, silicon oxide (SiOx), silicon nitride (SiNx), or a combination thereof. In another exemplary embodiment, the second substrate 120 may be a plastic film made of polyethylene phthalate (PET) or polycarbonate (PC). In still another exemplary embodiment, the second substrate 120 may be made of a glass material. Further, in still another exemplary embodiment, the second substrate 120 may be made of the same material as the first substrate 110.

The wavelength conversion layer 130 may be interposed between the first substrate 110 and the second substrate 120. Specifically, the wavelength conversion layer 130 may be arranged between a center part of the first substrate 110 and a center part of the second substrate 120. The wavelength conversion layer 130 may convert the wavelength of the light that is incident to the wavelength conversion layer 130.

The thickness th1 of the wavelength conversion layer 130 may be constant. In an exemplary embodiment, the total thickness th1 of the wavelength conversion layer 130 may be 300 μm over the whole surface of the first substrate 110. This is merely exemplary, and the thickness th1 may differ depending on the products.

The wavelength conversion layers 130 may include a wavelength conversion material, for example, phosphor, quantum dots, or a combination thereof.

The phosphor may be a general organic or inorganic phosphor. In an exemplary embodiment, the phosphor may be yellow phosphor. The yellow phosphor may be a YAG phosphor material, a silicate phosphor material, an oxynitride phosphor material, or a combination thereof, but is not limited thereto.

The quantum dot means a semiconductor nano-particle of a core-shell structure having a size in the range of several to several tens of nm, and has the characteristics that the emitted light differs depending on the size of the particle by a quantum quanfinement effect. More specifically, the quantum dot generates strong light in a narrow wavelength range, and the light emitted from the quantum dot is generated as unstable (unsteady) electrons come down from a conduction band to a valence band. In this case, the quantum dot has properties that it generates light of shorter wavelength as its particle becomes smaller, while it generates light of longer wavelength as its particle becomes larger. Accordingly, through adjustment of the size of the quantum dots, visible light of a desired wavelength can be output without exception.

The quantum dot may include any one of Si nanocrystal, II-IV group compound semiconductor nanocrystal, III-V group compound semiconductor nanocrystal, IV-VI group compound nanocrystal, and a mixture thereof.

The II-VI group compound semiconductor nanocrystal may be any one selected from the group including CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, and HgZnSTe.

Further, the III-V group compound semiconductor nanocrystal may be any one selected from the group including GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs, and the IV-VI group compound semiconductor nanocrystal may be SbTe.

The wavelength conversion layer 130 may further include a dispersive medium that disperses the wavelength conversion material in addition to the wavelength conversion material, such as phosphor or quantum dots. That is, the phosphor or quantum dot may be dispersed in a state where the phosphor or quantum dot is naturally coordinated with the dispersive medium, such as an organic solvent or resin. The dispersive medium may be any transparent medium which does not exert an influence on the wavelength conversion performance of the phosphor or quantum dot, and does not reflect or absorb the light.

The organic solvent may include, for example, at least one of toluene, chloroform, and ethanol, and the resin may include, for example, at least one of epoxy, silicone, polystyrene, and acrylate.

Further, the wavelength conversion layer 130 may further include a UV initiator, thermosetting additives, a crosslinker, a diffuser, or a combination thereof in addition to the dispersive medium. As described above, the wavelength conversion layer 130 may be positioned on the first substrate 110 in a state where the wavelength conversion material and the additives are mixed.

The spacer 140 may be interposed between the first substrate 110 and the second substrate 120. Specifically, the spacer 140 may be arranged in the wavelength conversion layer 130. In an exemplary embodiment, the spacer 140 may be positioned to be mixed with the wavelength conversion layer 130. That is, the spacer 140 may be surrounded by the wavelength conversion layer 130. The spacer 140 can keep a constant distance between the first substrate 110 and the second substrate 120.

The spacer 140 may come in direct contact with the first substrate 110, the second substrate 120, and the wavelength conversion layer 130. Specifically, an upper part of the spacer 140 may come in direct contact with an upper surface of the first substrate 110. Further, a lower part of the spacer 140 may come in direct contact with a lower surface of the second substrate 120. Further, a side part of the spacer 140 may come in direct contact with the wavelength conversion layer 130.

The refraction index of the spacer 140 may be substantially equal to the refraction index of a dispersive medium included in the wavelength conversion layer 130, for example, resin. The spacer 140 may perform a similar function to the above-described dispersive medium. That is, the spacer 140 may serve to disperse the wavelength conversion material included in the wavelength conversion layer 130.

The spacer 140 may be in a spherical shape. In an exemplary embodiment, the diameter of the spacer 140 may be substantially equal to the gap distance between the first substrate 110 and the second substrate 120, but is not limited thereto. The diameter of the spacer 140 may be smaller than the gap distance between the first substrate 110 and the second substrate 120.

A plurality of spacers 140 may be provided. The plurality of spacers 140 may be positioned to be randomly dispersed in the wavelength conversion layer 130. In an exemplary embodiment, the gap distances between the neighboring spacers 140 may differ from each other. In another exemplary embodiment, parts of the plurality of spacers 140 may come in direct contact with each other.

The mass of the spacer 140 may be about 10 to 20% of the mass of the wavelength conversion layer 130. If the mass of the spacer 140 is smaller than 10% of the mass of the wavelength conversion layer 130, the distance between the first substrate 110 and the second substrate 120 may not be stably kept. If the mass of the spacer 140 exceeds 20% of the mass of the wavelength conversion layer 130, the wavelength conversion function of the wavelength conversion member 100 may deteriorate. In an exemplary embodiment, the mass of the spacer 140 may be about 15% of the mass of the wavelength conversion layer 130, but is not limited thereto.

The sealant 150 may be interposed between the first substrate 110 and the second substrate 120. Specifically, the sealant 150 may be arranged between an edge part of the first substrate 110 and an edge part of the second substrate 120, but is not limited thereto. The sealant 150 may be arranged on the side surface of the first substrate 110 and the side surface of the second substrate 120 to surround both side surfaces of the first substrate 110 and the second substrate 120.

The sealant 150 may surround the edge of the wavelength conversion layer 130. Accordingly, the wavelength conversion layer 130 may be completely sealed by the first substrate 110, the second substrate 120, and the sealant 150.

The sealant 150 may be made of a material that can protect the wavelength conversion layer 130 from external moisture and oxygen. In an exemplary embodiment, the sealant 150 may be made of an acrylic or epoxy light curing resin or thermosetting resin. In another exemplary embodiment, the sealant 150 may be made of glass frit.

As described above, since the wavelength conversion member 100 according to an embodiment includes the spacer 140 in the wavelength conversion layer 130, the distance between the first substrate 110 and the second substrate 120 can be kept constant. Thus, the thickness of the wavelength conversion layer 130 can also be kept constant. Accordingly, the light passing through the wavelength conversion layer 130 may have substantially the same color.

Figure 5:
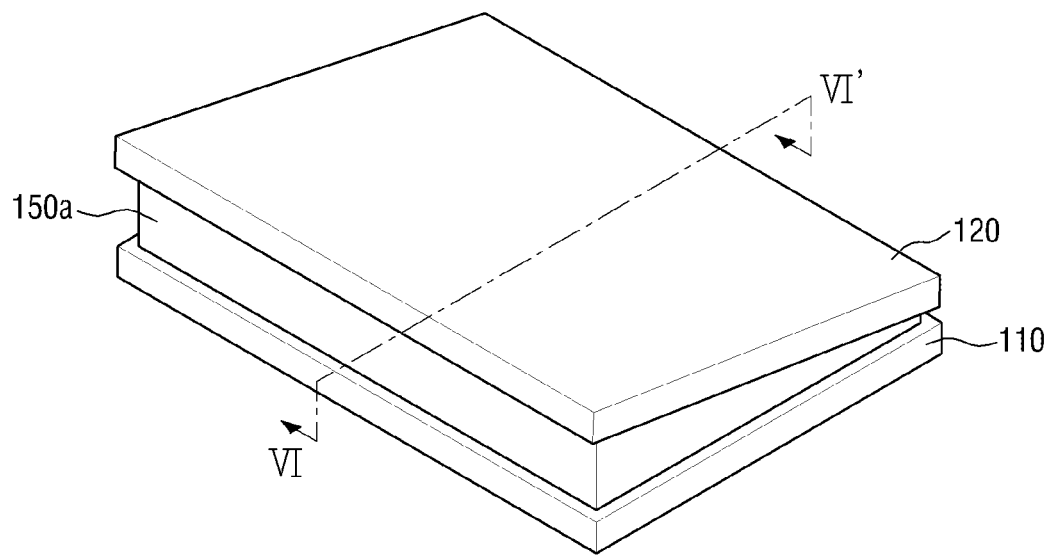
FIG. 5 is a perspective view of a wavelength conversion member of a different type for comparison with the wavelength conversion member of FIG. 1.
Figure 6:
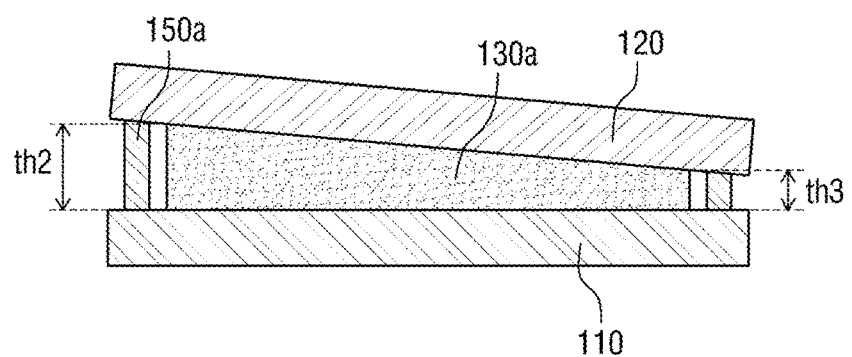
FIG. 6 is a cross-sectional view taken along line VI-VI' of FIG. 5.
Figure 7:
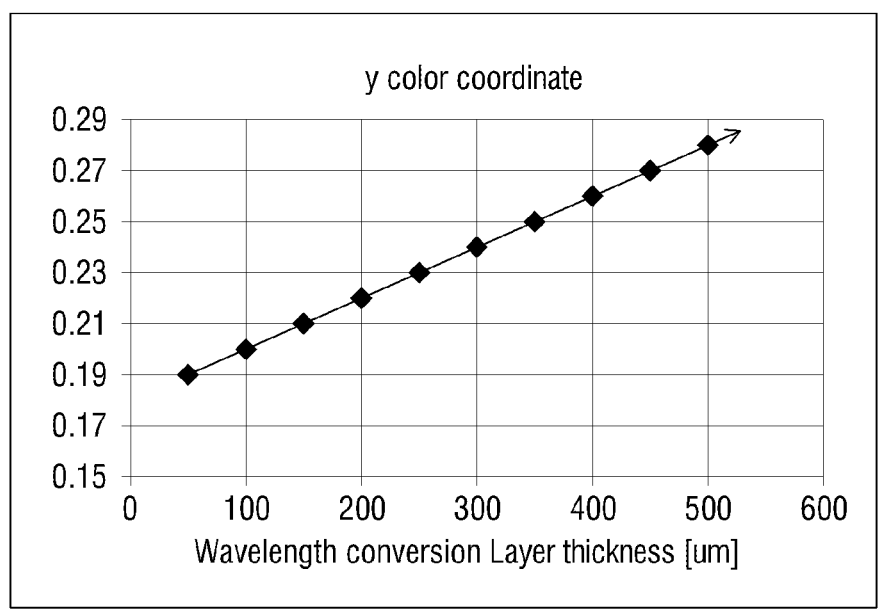
FIG. 7 is a graph illustrating y color coordinates of light that passes through a wavelength conversion layer of the wavelength conversion member of FIG. 5 according to the thickness of the wavelength conversion layer.

Hereinafter, the effects of the wavelength conversion member 100 as described above will be described in more detail with reference to FIGS. 5 to 7. FIG. 5 is a perspective view of a wavelength conversion member 100a of a different type for comparison with the wavelength conversion member 100 of FIG. 1, and FIG. 6 is a cross-sectional view taken along line VI-VI' of FIG. 5. FIG. 7 is a graph illustrating y color coordinates of light that passes through a wavelength conversion layer 130a of the wavelength conversion member 100a of FIG. 5 according to the thickness of the wavelength conversion layer.

Referring to FIGS. 5 to 7, since a wavelength material and a sealant 150a have fluidity in the case where a wavelength conversion member 100a does not include a spacer 140, any one of the two substrates may be tilted or drooped when the two substrates are attached after the wavelength conversion material and the sealant 150a are formed on the first substrate 110, and this may cause the thickness of the wavelength conversion layer 130a to differ depending on the position thereof. This phenomenon may mainly occur in a process using a large-area substrate. For example, the thickness th2 of one side of the wavelength conversion layer 130a may be 400 µm and the thickness th3 of the other side of the wavelength conversion layer 130a that faces the one side thereof may be 200 µm.

As described above, if the thickness of the wavelength conversion layer 130a differs depending on the position thereof, the coordinates of the light that has passed through the wavelength conversion layer 130a may also differ depending on the position thereof. For convenience in explanation, it is assumed that blue light that is incident to the wavelength conversion layer 130a is converted into pure white light if the thickness of the wavelength conversion layer 130a is 300 µm. That is, if the thickness of the wavelength conversion layer 130a is 300 µm, the y color coordinates of the light that has passed through the wavelength conversion layer 130a may be 0.24 that is a desired value. However, the y color coordinates of the light that has passed through one side of the wavelength conversion layer 130a having the thickness th2 of 400 µm may be 0.26 that is larger than 0.24 that is the desired value, and the y color coordinates of the light that has passed through the other side of the wavelength conversion layer 130a having the thickness th3 of 200 µm may be 0.22 that is smaller than 0.24 that is the desired value. In other words, the wavelength conversion is not performed as much as desired on one side of the wavelength conversion layer 130a to cause bluish light to be emitted, and the wavelength conversion is excessively performed on the other side of the wavelength conversion layer 130a to cause yellowish light to be emitted. As described above, if the light having non-uniform color is transferred to the display panel 200, it becomes difficult to express an image of a desired color on the display panel 200.

Figure 8:
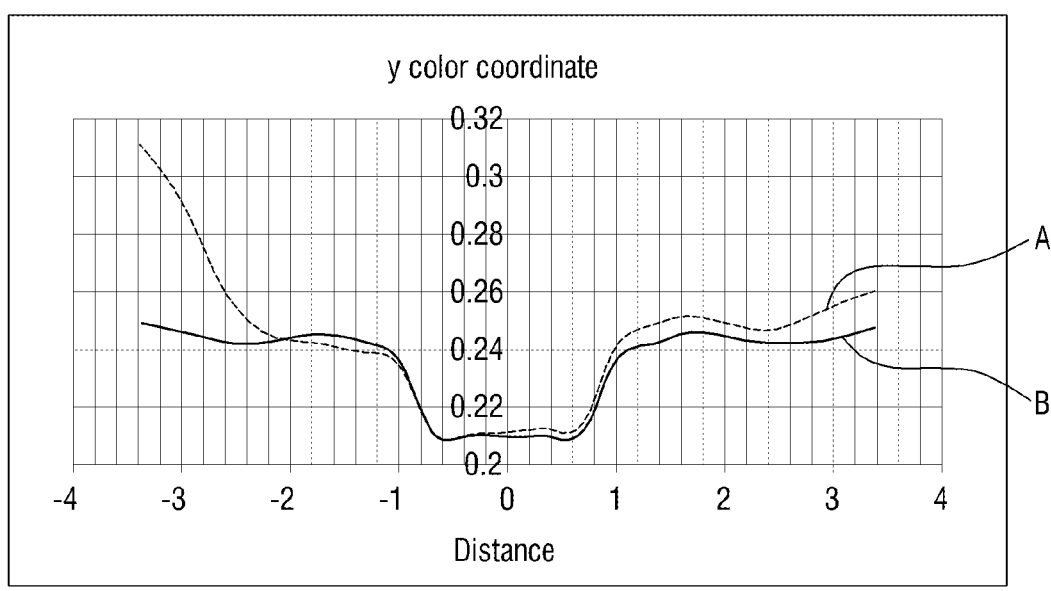
FIG. 8 is a schematic simulation graph illustrating y color coordinates of light that passes through the wavelength conversion member of FIG. 2 and the wavelength conversion member of FIG. 5 in the case where a point light source that emits blue light is arranged on the centers of the wavelength conversion members of FIGS. 2 and 5.

Hereinafter, the wavelength conversion member 100 according to an embodiment and the wavelength conversion member 100a that does not include the spacer 140 will be compared with each other with reference to FIG. 8. FIG. 8 is a schematic simulation graph illustrating y color coordinates of light having passed through the wavelength conversion member 100 of FIG. 2 and the wavelength conversion member 100a of FIG. 5 in the case where a point light source that emits blue light is arranged on the centers of the wavelength conversion members 100 and 100a. Here, the vertical axis represents y color coordinates, and the horizontal axis represents a relative distance with respect to the point light source.

In this simulation, it is assumed that blue light that is incident to the wavelength conversion layer is converted into pure white light if the thickness of the wavelength conversion layer is 200 µm. However, the intensity of the light that is emitted from the point light source is high in the center parts of the wavelength conversion members 100 and 100a that are adjacent to the point light source, and thus the wavelength conversion layer is unable to sufficiently convert the blue light into the white light. Accordingly, explanation will now be made except for the above-described parts.

In FIG. 8, the graph A indicates the y color coordinates of the light that has passed through the wavelength conversion member 100a of FIG. 5 that does not include the spacer 140. Here, the y color coordinates were measured along line VI-VI' of FIG. 5. Further, the thickness th2 of one side of the wavelength conversion layer 130a was set to 600 µm, and the thickness th3 of the other side of the wavelength conversion layer 130a was set to 200 µm. In this case, the y color coordinates of the light that passed through the one side of the wavelength conversion layer 130a became much larger than 0.24 that was a desired value. Further, since it was assumed that the thickness of the wavelength conversion layer 130a was decreased as going from one side to the other side of the wavelength conversion layer 130a, the thickness of a region that is adjacent to the other side of the wavelength conversion layer 130a was larger than 200 µm. Accordingly, the y color coordinates of the light that passed through the region adjacent to the other side of the wavelength conversion layer 130a also became somewhat larger than 0.24.

In contrast, the graph B indicates the y color coordinates of the light that has passed through the wavelength conversion member 100 of FIG. 2 that includes the spacer 140. Here, the y color coordinates were measured along line IV-IV' of FIG. 2. Further, the thickness th1 of the wavelength conversion layer 130 was constantly set to 200 µm. In this case, the y color coordinates of the light that passed through a region excluding the center part of the wavelength conversion layer 130 was close to 0.24 that was the desired value.

As described above, since the thickness of the wavelength conversion layer 130 of the wavelength conversion member 100 according to an embodiment is constant, the light of the constant color can be emitted from the whole surface of the wavelength conversion layer 130.

Figure 9:
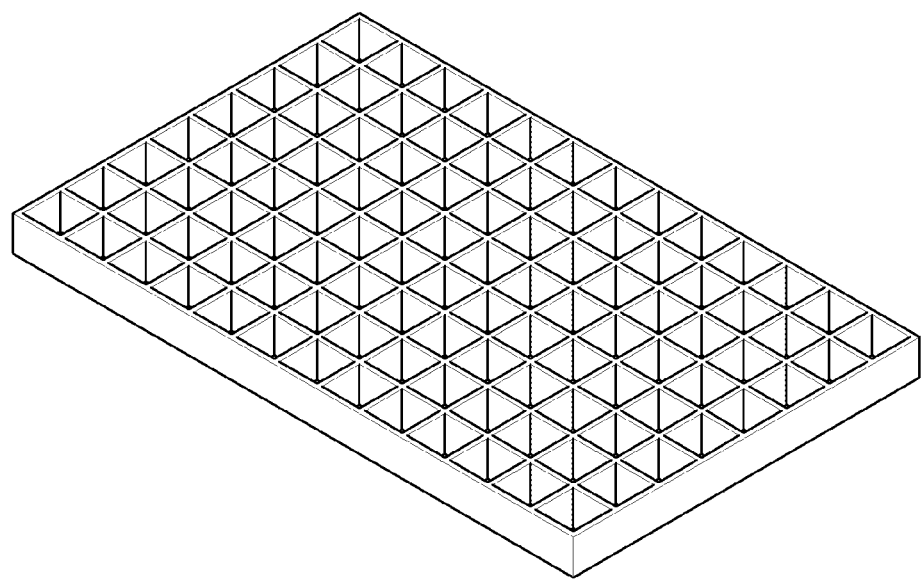
FIG. 9 is a perspective view of a spacer according to another embodiment.
Figure 10:
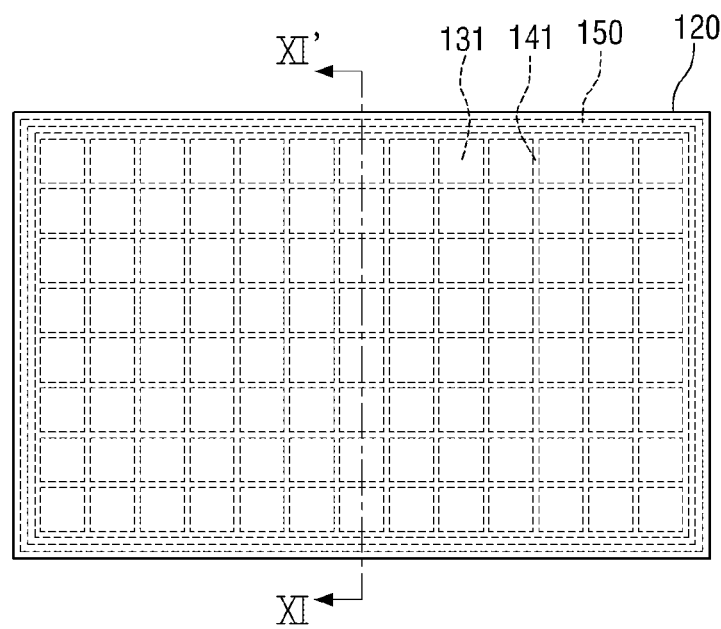
FIG. 10 is a plan view of a wavelength conversion member including the spacer of FIG. 9.
Figure 11:
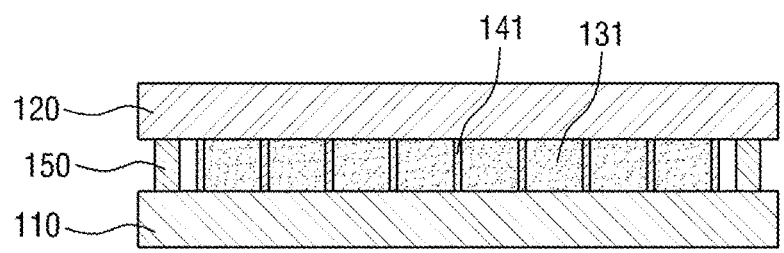
FIG. 11 is a cross-sectional view taken along line XI-XI' of FIG. 10.

FIG. 9 is a perspective view of a spacer 141 according to another embodiment. FIG. 10 is a plan view of a wavelength conversion member 101 including the spacer 141 of FIG. 9, and FIG. 11 is a cross-sectional view taken along line XI-XI' of FIG. 10. For convenience in explanation, the same reference numerals are used for substantially the same elements as the elements illustrated in the above-described drawings, and the duplicate explanation thereof will be omitted.

Referring to FIGS. 9 to 11, the spacer 141 according to another embodiment may include a plurality of hole patterns. In an exemplary embodiment, the plurality of hole patterns may be in a polygonal column shape. For example, in the exemplary embodiment illustrated in FIG. 9, the plurality of hole patterns may be in a rectangular column shape. That is, as shown in FIG. 10, the spacer 141 may be in the form of a lattice, but is not limited thereto. The plurality of hole patterns may have various shapes.

The wavelength conversion layer 131 may fill the plurality of hole patterns. In other words, the wavelength conversion layer 131 may be separated into a plurality of sub-wavelength conversion layers by the plurality of hole patterns. In this case, the plurality of sub-wavelength conversion layers may be surrounded by side walls of the spacer 141.

Figure 12:
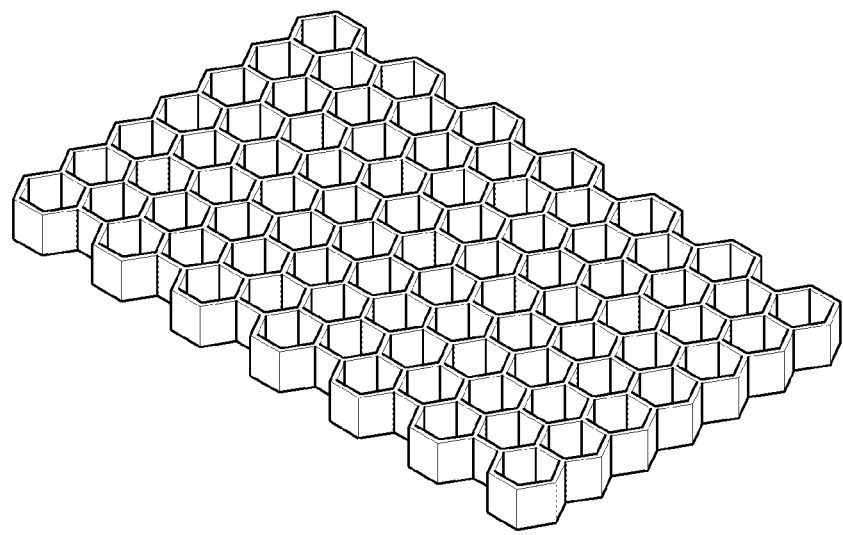
FIG. 12 is a perspective view of a spacer according to still another embodiment.
Figure 13:
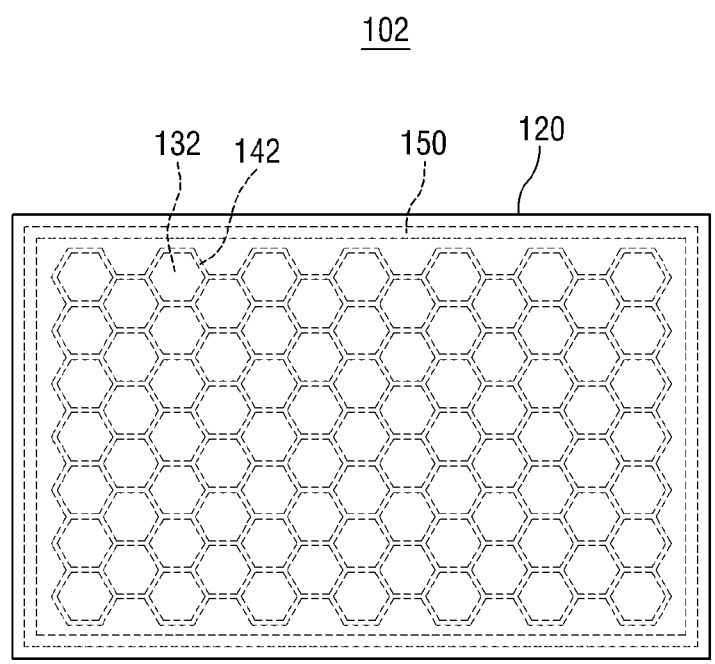
FIG. 13 is a plan view of a wavelength conversion member including the spacer of FIG. 12.

FIG. 12 is a perspective view of a spacer 142 according to still another embodiment, and FIG. 13 is a plan view of a wavelength conversion member 102 including the spacer 142 of FIG. 12. For convenience in explanation, the same reference numerals are used for substantially the same elements as the elements illustrated in the above-described drawings, and the duplicate explanation thereof will be omitted.

Referring to FIGS. 12 and 13, a plurality of hole patterns of a spacer 142 according to still another embodiment may be in a hexagonal prism shape. Further, a wavelength conversion layer 132 may fill the plurality of hole patterns. In this embodiment, the gap distance between the wavelength conversion layer 132 and the sealant 150 may differ depending on the position thereof. That is, the gap distance between the wavelength conversion layer 132 and the sealant 150 may alternately repeat increases and decreases along the edges of the first substrate 110 and the second substrate 120.

Figure 14:
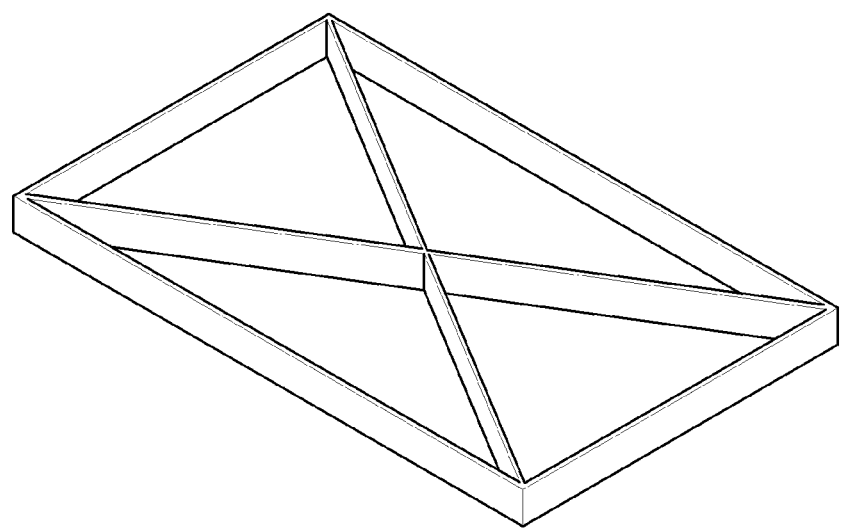
FIG. 14 is a perspective view of a spacer according to still another embodiment.
Figure 15:
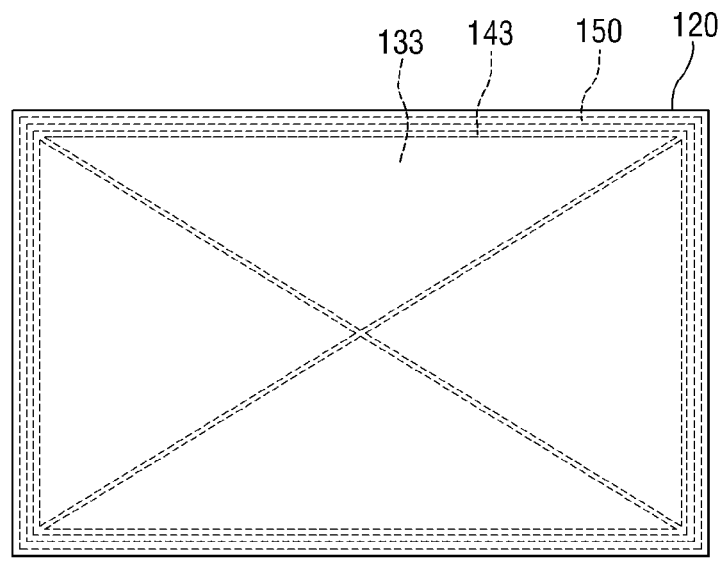
FIG. 15 is a plan view of a wavelength conversion member including the spacer of FIG. 14.

FIG. 14 is a perspective view of a spacer 143 according to still another embodiment, and FIG. 15 is a plan view of a wavelength conversion member 103 including the spacer 143 of FIG. 14. For convenience in explanation, the same reference numerals are used for substantially the same elements as the elements illustrated in the above-described drawings, and the duplicate explanation thereof will be omitted.

Referring to FIGS. 14 and 15, a plurality of hole patterns of a spacer 143 according to still another embodiment may be in a triangular prism shape. Further, a wavelength conversion layer 133 may fill the plurality of hole patterns.

Although embodiments have been described for illustrative purposes, those skilled in the art will appreciate that various modifications, additions and substitutions are possible, without departing from the scope and spirit of the inventive concept as disclosed in the accompanying claims.

What is claimed is:

1. A wavelength conversion member comprising:
   a first substrate;
   a second substrate;
   a wavelength conversion layer interposed between the first substrate and the second substrate and directly contacting both the first substrate and the second substrate, wherein each of the first substrate and the second substrate is transparent and insulating, wherein the wavelength conversion layer comprises wavelength conversion material members and a dispersive medium, wherein the wavelength conversion material members are dispersed in the dispersive medium, and wherein the dispersive medium is formed of a first material; and
   a spacer interposed between the first substrate and the second substrate to keep a distance between the first substrate and the second substrate, wherein the spacer is formed of a second material, wherein the second material is different from the first material, and wherein a refractive index of the spacer is substantially equal to a refractive index of the dispersive medium.

2. The wavelength conversion member of claim 1, wherein the wavelength conversion material members comprises quantum dots.

3. The wavelength conversion member of claim 2, wherein the dispersive medium comprises resin, and wherein the resin is mixed with the quantum dots.

4. The wavelength conversion member of claim 3, wherein the refractive index of the spacer is substantially equal to a refractive index of the resin.

5. The wavelength conversion member of claim 1, wherein the spacer comes in direct contact with the first substrate, the second substrate, and the wavelength conversion layer.

6. The wavelength conversion member of claim 1, wherein the spacer is mixed with the wavelength conversion layer.

7. The wavelength conversion member of claim 1, wherein the spacer is surrounded by the wavelength conversion layer.

8. The wavelength conversion member of claim 1, wherein a plurality of spacers are provided, and
   the spacers are randomly dispersed in the wavelength conversion layer.

9. The wavelength conversion member of claim 1, wherein the spacer is in a spherical shape.

10. The wavelength conversion member of claim 1, wherein a diameter of the spacer is substantially equal to a gap distance between the first substrate and the second substrate.

11. The wavelength conversion member of claim 1, wherein the spacer comprises a plurality of holes, and wherein separate portions of the wavelength conversion layer are respectively positioned inside the holes.

12. The wavelength conversion member of claim 11, wherein each of the holes is in a polygonal column shape.

13. The wavelength conversion member of claim 11, wherein a portion of the wavelength conversion layer is positioned inside a hole among the plurality of holes and directly contacts at least three inner sides of the hole.

14. A backlight assembly comprising:
   a light guide plate comprising a first side and a second side, wherein the first side is directly connected to the second side and is oriented at an angle with respect to the second side;
   a light source configured to emit light, wherein the light source comprises a circuit board and a light source element, wherein the light source element is positioned between the circuit board and the first side of the light guide plate; and
   a wavelength conversion member configured to convert a wavelength of the light emitted from the light source, wherein the light source is positioned outside the wavelength conversion member, and
   wherein the wavelength conversion member includes:
   a first substrate;
   a second substrate;
   a wavelength conversion layer interposed between the first substrate and the second substrate; and
   a spacer interposed between the first substrate and the second substrate to keep a distance between the first substrate and the second substrate, wherein the first substrate is positioned between the spacer and the second side of the light guide plate, wherein the spacer comprises a first wall and a second wall, and wherein the first wall extends at an obtuse angle with respect to the second wall in a plan view of the wavelength conversion member.

15. The backlight assembly of claim 14, wherein the wavelength conversion layer comprises quantum dots.

16. The backlight assembly of claim 14, wherein the spacer comes in direct contact with the first substrate, the second substrate, and the wavelength conversion layer.

17. The backlight assembly of claim 14, wherein the light source is configured to emit blue light, and
   the wavelength conversion member is configured to convert the blue light into white light.

18. A display device comprising:
a display panel configured to display an image; and
a backlight assembly configured to provide light to the display panel,
wherein the backlight assembly includes:
a light source configured to emit light; and
a wavelength conversion member configured to convert a wavelength of the light emitted from the light source,
wherein the wavelength conversion member includes:
a first substrate;
a second substrate;
a wavelength conversion layer interposed between the first substrate and the second substrate;
a spacer interposed between the first substrate and the second substrate to keep a distance between the first substrate and the second substrate, the spacer completely enclosing the wavelength conversion layer in a plan view of the wavelength conversion member; and
a sealant surrounding the spacer, wherein a section of the spacer extends at an acute angle with respect to a section of the sealant in the plan view of the wavelength conversion member.

19. The display device of claim 18, wherein the wavelength conversion layer comprises quantum dots.

20. The display device of claim 18, wherein the light emitted from the light source passes through the wavelength conversion member and is transferred to the display panel.

21. The wavelength conversion member of claim 1,
wherein at least a part of the spacer is in a hexagonal prism shape which includes a hole.

22. The display device of claim 18,
wherein at least a part of the spacer is in a hexagonal prism shape which includes a hole.

* * * * *